(12) United States Patent
Genslak et al.

(10) Patent No.: US 9,599,006 B2
(45) Date of Patent: Mar. 21, 2017

(54) CATALYST OXYGEN STORAGE CAPACITY ADJUSTMENT SYSTEMS AND METHODS

(75) Inventors: Robert J. Genslak, Macomb, MI (US); Robert E. Heger, Bloomfield Hills, MI (US); Edward Stuteville, Linden, MI (US); Jerry J. Sheahan, Canton, MI (US); Thomas J. Large, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 13/221,135

(22) Filed: Aug. 30, 2011

(65) Prior Publication Data

US 2013/0054083 A1 Feb. 28, 2013

(51) Int. Cl.

| F01N 11/00 | (2006.01) |
|---|---|
| F01N 3/10 | (2006.01) |
| F02D 41/02 | (2006.01) |
| F02D 41/14 | (2006.01) |
| F02D 41/22 | (2006.01) |

(52) U.S. Cl.
CPC ............ *F01N 11/007* (2013.01); *F01N 3/101* (2013.01); *F02D 41/0295* (2013.01); *F02D 41/1441* (2013.01); *F02D 41/1456* (2013.01); *F01N 2550/02* (2013.01); *F02D 41/22* (2013.01); *F02D 2200/0816* (2013.01); *Y02T 10/22* (2013.01); *Y02T 10/47* (2013.01)

(58) Field of Classification Search
CPC .... F01N 3/101; F01N 11/007; F02D 41/0295; F02D 41/1441; F02D 41/1456

USPC .............. 701/29, 114, 30.5, 32.9; 73/114.75, 73/30.01, 23.32, 2, 3.31; 60/277, 285
See application file for complete search history.

(56) References Cited

U.S. PATENT DOCUMENTS

| 6,324,893 B1 * | 12/2001 | Watanabe et al. ........... 73/23.32 |
| 6,694,244 B2 * | 2/2004 | Meyer et al. ................. 701/114 |
| 6,802,181 B2 | 10/2004 | Wang et al. |
| 6,874,313 B2 | 4/2005 | Yurgil et al. |

(Continued)

FOREIGN PATENT DOCUMENTS

| CN | 102116190 A | 7/2011 |
| CN | 102791982 A | 11/2012 |

OTHER PUBLICATIONS

Robust oxygen sensor and catalyst monitor to reduce the 'gap' Paul Rodatz, Tino Arlt, Bodo Odendall, Heiko Schrieber, Bernd Kopp.*

(Continued)

*Primary Examiner* — Thomas G Black
*Assistant Examiner* — Peter D Nolan

(57) ABSTRACT

A system for a vehicle includes an oxygen storage capacity (OSC) determination module, a delay determination module, a correction module, and a fault detection module. The OSC determination module determines an OSC period of a catalyst of an exhaust system based on first and second amounts of oxygen measured using first and second oxygen sensors located upstream and downstream of the catalyst, respectively. The delay determination module determines a delay period of the second oxygen sensor. The correction module sets a corrected OSC period for the catalyst based on a difference between the OSC period and the delay period. The fault detection module selectively indicates that a fault is present in the catalyst based on the corrected OSC period.

16 Claims, 6 Drawing Sheets

(56) References Cited

U.S. PATENT DOCUMENTS

| | | | |
|---|---|---|---|
| 7,111,451 B2 * | 9/2006 | Dou et al. ............... | 60/285 |
| 7,444,235 B2 | 10/2008 | Anilovich | |
| 7,707,821 B1 * | 5/2010 | Legare ................. | 60/277 |
| 2003/0017603 A1 | 1/2003 | Uchida et al. | |
| 2003/0159432 A1 | 8/2003 | Kobayashi et al. | |
| 2004/0244361 A1 | 12/2004 | Tanabe et al. | |
| 2005/0252196 A1 | 11/2005 | Aliakbarzadeh et al. | |
| 2007/0227123 A1 | 10/2007 | Iida et al. | |
| 2008/0115486 A1 | 5/2008 | Yurgil | |
| 2008/0184695 A1 | 8/2008 | Anilovich et al. | |
| 2008/0229727 A1 | 9/2008 | Wang et al. | |
| 2008/0302087 A1 * | 12/2008 | Genslak et al. ........... | 60/277 |
| 2008/0306673 A1 | 12/2008 | Yasui et al. | |
| 2009/0030592 A1 * | 1/2009 | Mitsutani ............. | 701/109 |
| 2009/0266054 A1 | 10/2009 | Iihoshi et al. | |
| 2009/0288391 A1 | 11/2009 | Aoki | |
| 2009/0293451 A1 | 12/2009 | Kesse | |
| 2010/0101214 A1 | 4/2010 | Herman et al. | |
| 2011/0138876 A1 * | 6/2011 | Arlt et al. ............. | 73/23.31 |
| 2012/0031170 A1 * | 2/2012 | Matsumoto et al. ....... | 73/30.01 |
| 2012/0131992 A1 * | 5/2012 | Fushiki ............... | 73/114.75 |
| 2012/0324869 A1 | 12/2012 | Nakamura | |

OTHER PUBLICATIONS

U.S. Appl. No. 12/623,013, filed Nov. 20, 2009, Wesley W. Wald.
P. Rodatz, T. Arlt, B. Odendall, H. Schreiber, B. Kopp; "Robust oxygen sensor and catalyst monitor to reduce the 'gap'"; Presented at IAV GmbH 5$^{th}$ Conference: Apr. 14 and 15, 2011 in Braunschweig, Germany; 10 pages.

* cited by examiner

CATALYST OXYGEN STORAGE CAPACITY ADJUSTMENT SYSTEMS AND METHODS

FIELD

The present disclosure relates to internal combustion engines and more particularly to oxygen storage catalysts of internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A system for a vehicle includes an oxygen storage capacity (OSC) determination module, a delay determination module, a correction module, and a fault detection module. The OSC determination module determines an OSC period of a catalyst of an exhaust system based on first and second amounts of oxygen measured using first and second oxygen sensors located upstream and downstream of the catalyst, respectively. The delay determination module determines a delay period of the second oxygen sensor. The correction module sets a corrected OSC period for the catalyst based on a difference between the OSC period and the delay period. The fault detection module selectively indicates that a fault is present in the catalyst based on the corrected OSC period.

A method for a vehicle includes: determining an oxygen storage capacity (OSC) period of a catalyst of an exhaust system based on first and second amounts of oxygen measured using first and second oxygen sensors located upstream and downstream of the catalyst, respectively; determining a delay period of the second oxygen sensor; setting a corrected OSC period for the catalyst based on a difference between the OSC period and the delay period; and selectively indicating that a fault is present in the catalyst based on the corrected OSC period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
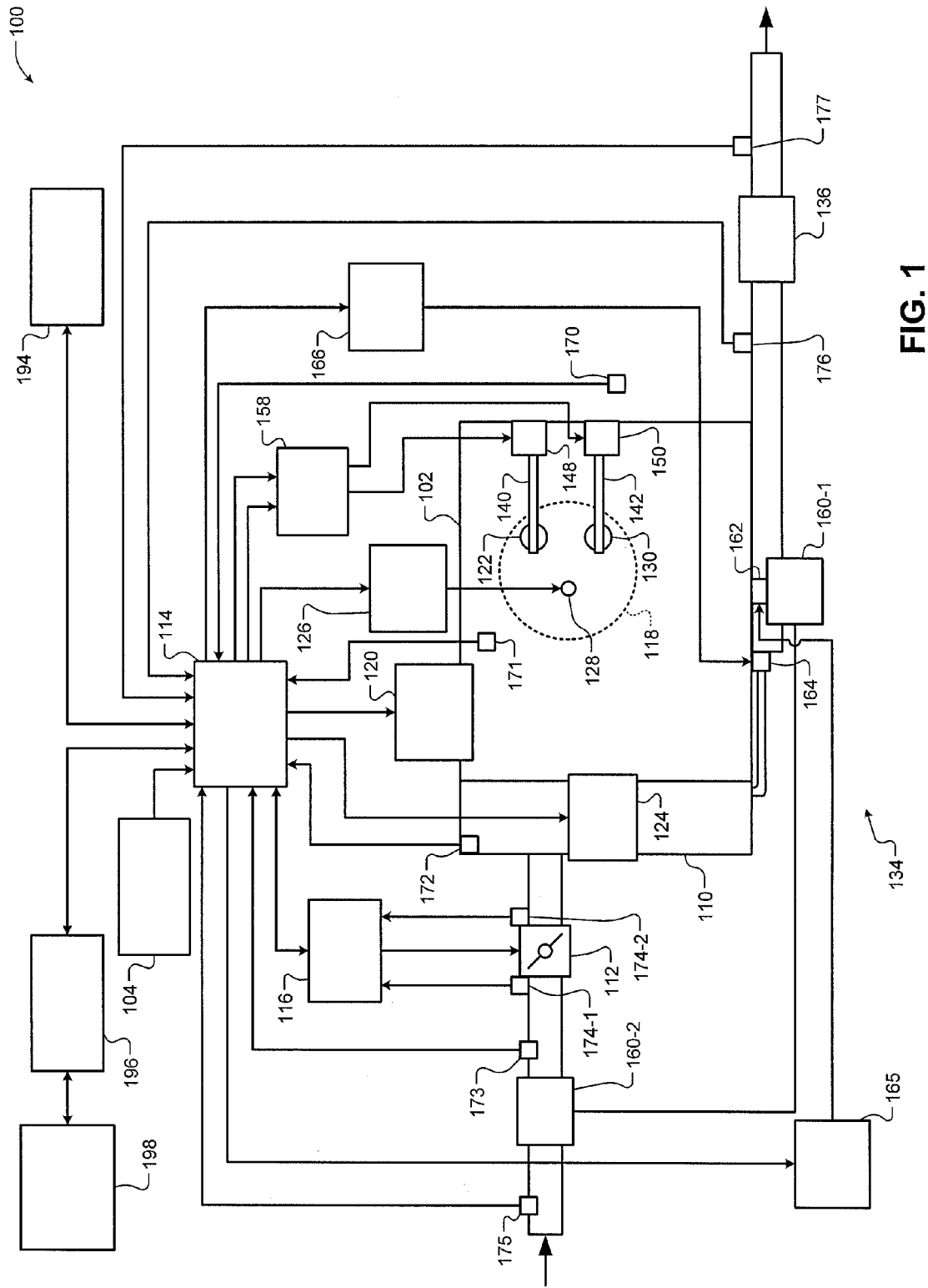
FIG. 1 is a functional block diagram of an example engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine of a vehicle outputs exhaust to a catalyst. The catalyst reacts with one or more components of the exhaust. The catalyst may store oxygen in the exhaust when the exhaust is oxygen rich (fuel lean) relative to stoichiometry. The catalyst's ability to store oxygen, however, may deteriorate over time.

A first oxygen sensor is located upstream of the catalyst. A second oxygen sensor is located downstream of the catalyst. An engine control module (ECM) controls operation of the engine. For example, the ECM controls fueling of the engine. Under some circumstances, the ECM may control the fueling of the engine to transition from a fuel rich state to a fuel lean state. For example, the ECM may transition the fueling of the engine from fuel rich to fuel lean to determine whether a fault is present in the second oxygen sensor and/or to determine whether a fault is present in the catalyst.

The ECM determines whether the fault is present in the second oxygen sensor based on the amount of oxygen measured using the second oxygen sensor between a first time and a second time. The first time may be a time during operation in the fuel rich state prior to a transition from the fuel rich state to the fuel lean state. The second time may be a time when the amount of oxygen measured by the second oxygen sensor crosses a predetermined value. The ECM may determine an area under a curve formed by the amount of oxygen between the first and second times. The ECM may apply a filter to the area to generate a filtered area. The ECM may determine whether the fault is present in the second oxygen sensor based on one of the area and the filtered area.

The ECM determines whether the fault is present in the catalyst based on a period during which the catalyst stores oxygen after a transition from the fuel rich state to the fuel lean state. The period may be referred to as an oxygen storage capacity (OSC) period of the catalyst. The ECM determines the OSC period of the catalyst based on the period between a third time when an amount of oxygen measured by the first oxygen sensor crosses a predetermined value and a fourth time when the amount of oxygen measured by the second oxygen sensor crosses a predetermined value. For example only, the ECM may determine that the fault is present in the catalyst when the OSC period is greater than a predetermined period.

Delay associated with the second oxygen sensor, however, may delay (the fourth time) when the amount of oxygen measured by the second oxygen sensor crosses the predetermined value. The fourth time being delayed causes the OSC period to increase. An increase in the OSC period associated with the delay of the second oxygen sensor may cause the OSC period to be greater than the predetermined period. The delay of the second oxygen sensor may therefore prevent the ECM from identifying the fault in the catalyst.

The ECM of the present disclosure determines a delay period of the second oxygen sensor as a function of one of the area and the filtered area. The ECM of the present disclosure corrects the OSC period for the catalyst based on the delay period of the second oxygen sensor. More specifically, the ECM determines a corrected OSC period for the catalyst based on a difference between the OSC period determined for the catalyst and the delay period of the second oxygen sensor. The ECM determines whether the fault is present in the catalyst based on the corrected OSC period.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, 12, or another suitable number of cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are may be named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating spark may be referred to as a firing event. The spark actuator module 126 may have the ability to vary the timing of the spark for each firing event. The spark actuator module 126 may even be capable of varying the spark timing for a next firing event when the spark timing is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through one or more exhaust valves, such as exhaust valve 130. The byproducts of combustion are exhausted from the vehicle via an exhaust system 134. The exhaust system 134 includes a catalyst 136, such as a three-way catalyst (TWC). The catalyst 136 reacts with one or more components of exhaust flowing through the catalyst 136. The catalyst 136 stores oxygen when the exhaust is fuel lean (oxygen rich).

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 165. The boost actuator module 165 may modulate the boost of the turbocharger by controlling the position of the wastegate 162. In various implementations, multiple turbochargers may be controlled by the boost actuator module 165. The turbocharger may have variable geometry, which may be controlled by the boost actuator module 165.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 164, which selectively redirects exhaust gas back to the intake manifold 110. The EGR valve 164 may be located upstream of the turbocharger's turbine 160-1. An EGR actuator module 166 may control the EGR valve 164 based on signals from the ECM 114.

The engine system 100 may measure the speed of the crankshaft in revolutions per minute (RPM) using an RPM sensor 170. The temperature of the engine coolant may be measured using an engine coolant temperature (ECT) sensor 171. The ECT sensor 171 may be located within the engine 102 or at other locations where the coolant is circulated, such as a radiator (not shown).

The pressure within the intake manifold 110 may be measured using a manifold absolute pressure (MAP) sensor 172. In various implementations, engine vacuum, which is the difference between ambient air pressure and the pressure within the intake manifold 110, may be measured. The mass flow rate of air flowing into the intake manifold 110 may be measured using a mass air flow (MAF) sensor 173. In various implementations, the MAF sensor 173 may be located in a housing that also includes the throttle valve 112.

The throttle actuator module 116 may monitor the position of the throttle valve 112 using one or more throttle position sensors (TPS) 174. For example, first and second throttle position sensors 174-1 and 174-2 monitor the position of the throttle valve 112 and generate first and second throttle positions (TPS1 and TPS2), respectively, based on the throttle position. The ambient temperature of air being drawn into the engine 102 may be measured using an intake air temperature (IAT) sensor 175.

An upstream oxygen sensor 176 measures an amount (e.g., concentration) of oxygen in the exhaust flowing into the catalyst 136. A downstream oxygen sensor 177 measures an amount (e.g., concentration) of oxygen in the exhaust downstream of the catalyst 136. The ECM 114 may use signals from the sensors and/or one or more other sensors to make control decisions for the engine system 100.

A transmission control module 194 may control operation of the transmission. The ECM 114 may communicate with the transmission control module 194 for various reasons, such as to share parameters and to coordinate engine operation with shifting gears in the transmission. For example, the ECM 114 may selectively reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator. Each actuator receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 165, and the EGR actuator module 166. For these actuators, the actuator values may correspond to a number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
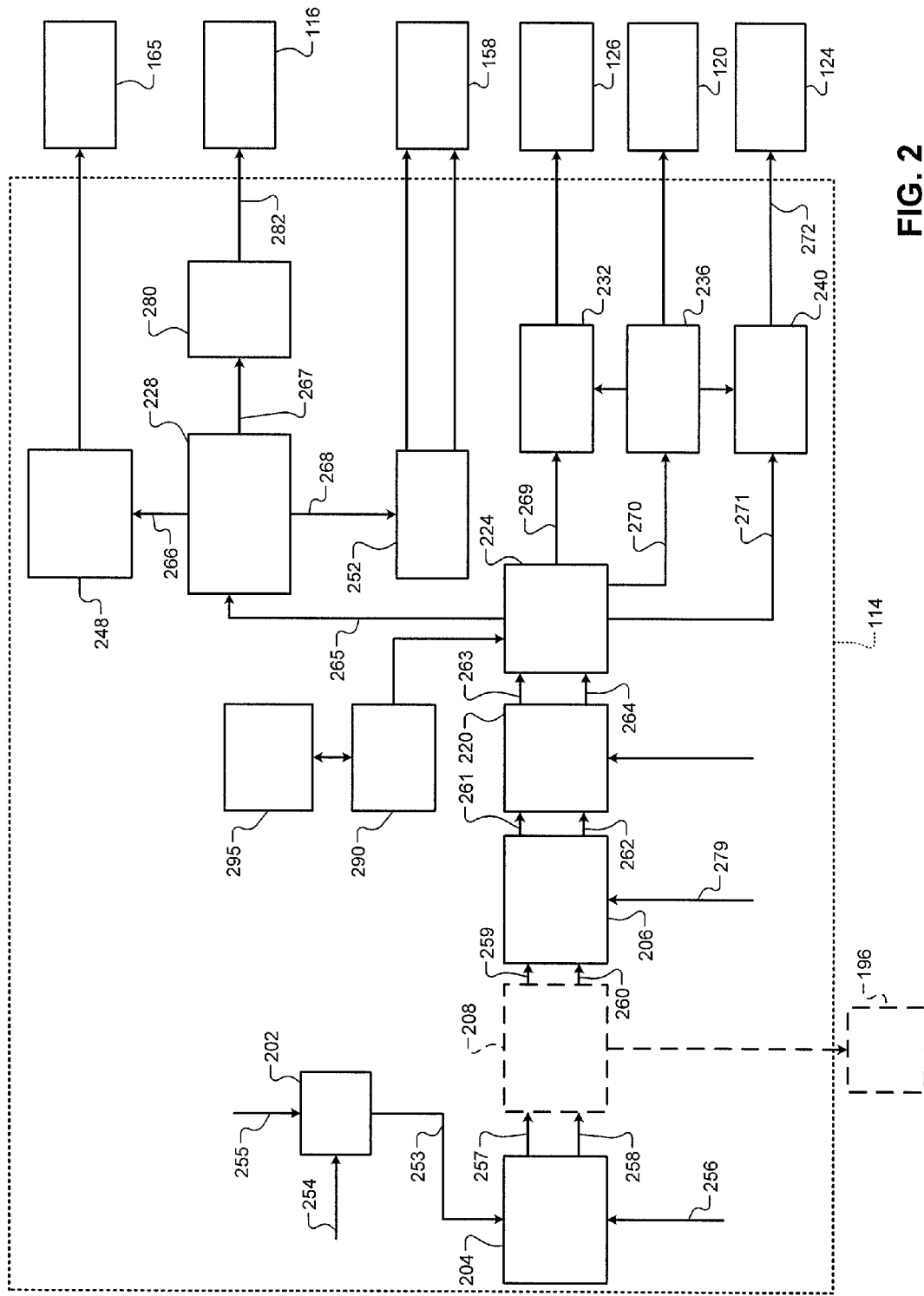
FIG. 2 is a functional block diagram of an example engine control system according to the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The example implementation of the ECM 114 also includes a reserves/loads module 220, an actuation module 224, an air control module 228, a spark control module 232, a cylinder control module 236, and a fuel control module 240. The example implementation of the ECM 114 also includes a boost scheduling module 248 and a phaser scheduling module 252.

The driver torque module 202 may determine a driver torque request 253 based on a driver input 254 from the driver input module 104. The driver input 254 may be based on, for example, a position of an accelerator pedal and a position of a brake pedal. The driver input 254 may also be based on inputs from a cruise control system, which may be an adaptive cruise control system. Adaptive cruise control systems vary vehicle speed to maintain a predetermined following distance. The driver torque module 202 may determine the driver torque request 253 further based on a vehicle speed 255. For example only, the vehicle speed 255 may be generated based on one or more measured wheel speeds, a transmission output shaft speed, and/or one or more other suitable parameters.

An axle torque arbitration module 204 arbitrates between the driver torque request 253 and other axle torque requests 256. Axle torque (torque to the wheels) may be produced by various sources including an engine and/or an electric motor. Generally, torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

The axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the driver and axle torque requests 253 and 256. As described below, the predicted and immediate torque requests 257 and 258 from the axle torque arbitration module 204 may selectively be adjusted by other modules of the ECM 114 before being used to control actuators of the engine system 100.

In general terms, the immediate torque request 258 is the amount of currently desired axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the actuator values to allow a faster transition to the predicted torque request 257, while still maintaining the axle torque at the immediate torque request 258.

In various implementations, the predicted torque request 257 may be based on the driver torque request 253. The immediate torque request 258 may be less than the predicted torque request 257, such as when the driver torque request 253 is causing wheel slip on an icy surface. In such a case, a traction control system (not shown) may request a reduction via the immediate torque request 258, and the ECM 114 reduces the torque produced by the engine system 100 to the immediate torque request 258. However, the ECM 114 controls the engine system 100 so that the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request 257, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request 258 is within the range, fast engine actuators can be set to cause the axle torque to be equal to the immediate torque request 258. When the ECM 114 requests the predicted torque request 257 to be output, the fast engine actuators can be controlled to vary the axle torque to the top of the range, which is the predicted torque request 257.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request 257 if the fast actuators were set to appropriate values. Meanwhile, the ECM 114 may set actuator values for fast actuators to values that, given the slow actuator values, cause the engine system 100 to produce the immediate torque request 258 instead of the predicted torque request 257.

The fast actuator values therefore cause the engine system 100 to produce the immediate torque request 258. When the ECM 114 decides to transition the axle torque from the immediate torque request 258 to the predicted torque request 257, the ECM 114 changes the actuator values for one or more fast actuators to values that correspond to the predicted torque request 257. Because the slow actuator values have already been set based on the predicted torque request 257, the engine system 100 is able to produce the predicted torque request 257 after only the delay imposed by the fast actuators. In other words, the longer delay that would otherwise result from changing axle torque using slow actuators is avoided.

For example only, when the predicted torque request 257 is equal to the driver torque request 253, a torque reserve may be created when the immediate torque request 258 is less than the driver torque request 253 due to a temporary torque reduction request. Alternatively, a torque reserve may be created by increasing the predicted torque request 257 above the driver torque request 253 while maintaining the immediate torque request 258 at the driver torque request 253. The resulting torque reserve can absorb sudden increases in required axle torque. For example only, sudden loads imposed by an air conditioner or a power steering pump may be counteracted by increasing the immediate torque request 258. If the increase in the immediate torque request 258 is less than the torque reserve, the increase can be quickly produced by using fast actuators. The predicted torque request 257 may also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request 258 while maintaining the values of the slow actuators. For example, to maintain a given idle speed, the immediate torque request 258 may vary within a range. If the predicted torque request 257 is set to a level above this range, variations in the immediate torque request 258 that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a calibrated value, a maximum amount of torque may be produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle opening area are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce the predicted torque request 257. Meanwhile, the spark timing can be set based on the immediate torque request 258, which is less than the predicted torque request 257. Although the throttle opening area generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark advance to a calibrated value, which allows the engine 102 to produce the full engine output torque achievable with the air flow already present. The engine output torque may therefore be quickly increased to the predicted torque request 257 without experiencing delays from changing the throttle opening area.

When the engine 102 is a compression-ignition engine, the fuel actuator module 124 may be a fast actuator and the throttle actuator module 116 and the boost actuator module 165 may be emissions actuators. The fuel mass may be set based on the immediate torque request 258, and the throttle opening area, boost, and EGR opening may be set based on the predicted torque request 257. The throttle opening area may generate more air flow than necessary to satisfy the predicted torque request 257. In turn, the air flow generated may be more than required for complete combustion of the injected fuel such that the air/fuel ratio is usually lean and changes in air flow do not affect the engine output torque. The engine output torque will therefore be equal to the immediate torque request 258 and may be increased or decreased by adjusting the fuel flow.

The throttle actuator module 116, the boost actuator module 165, and the EGR valve 164 may be controlled based on the predicted torque request 257 to control emissions and to minimize turbo lag. The throttle actuator module 116 may create a vacuum within the intake manifold 110 to draw exhaust gases through the EGR valve 164 and into the intake manifold 110.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 279, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests 261 and 262 may be generated by modifying one of the received requests based on another one or more of the received torque requests.

The propulsion torque requests 279 may include torque reductions for engine over-speed protection, torque increases for stall prevention, and torque reductions requested by the transmission control module 194 to accommodate gear shifts. The propulsion torque requests 279 may also result from clutch fuel cutoff, which reduces the engine output torque when the driver depresses the clutch pedal in a manual transmission vehicle to prevent a flare (rapid rise) in engine speed.

The propulsion torque requests 279 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the actuation module 224.

For example only, a catalyst light-off process or a cold start emissions reduction process may require retarded spark advance. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as for new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (NC) compressor clutch. The reserve for engagement of the NC compressor clutch may be created when the driver first requests air conditioning. The reserves/loads module 220 may increase the adjusted predicted torque request 263 while leaving the adjusted immediate torque request 264 unchanged to produce the torque reserve. Then, when the NC compressor clutch engages, the reserves/loads module 220 may increase the adjusted immediate torque request 264 by the estimated load of the NC compressor clutch.

The actuation module 224 receives the adjusted predicted and immediate torque requests 263 and 264. The actuation module 224 determines how the adjusted predicted and immediate torque requests 263 and 264 will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request 265 based on the adjusted predicted torque request 263. The air torque request 265 may be equal to the adjusted predicted torque request 263, setting air flow so that the adjusted predicted torque request 263 can be achieved by changes to other actuators.

The air control module 228 may determine desired actuator values based on the air torque request 265. For example only, the air control module 228 may determine a desired manifold absolute pressure (MAP) 266, a desired throttle position 267, and/or a desired air per cylinder (APC) 268 based on the air torque request 265. The desired MAP 266 may be used to determine a desired boost, and the desired APC 268 may be used to determine desired cam phaser positions and the desired throttle position 267. In various implementations, the air control module 228 may also determine an amount of opening of the EGR valve 164 based on the air torque request 265.

The actuation module 224 may also generate a spark torque request 269, a cylinder shut-off torque request 270, and a fuel torque request 271. The spark torque request 269 may be used by the spark control module 232 to determine how much to retard the spark timing (which reduces engine output torque) from a calibrated spark timing.

The calibrated spark timing may vary based on various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#). \quad (1)$$

This relationship may be embodied as an equation and/or as a lookup table. The air/fuel ratio (AF) may be the actual air/fuel ratio, as reported by the fuel control module 240.

When the spark advance is set to the calibrated spark timing, the resulting torque may be as close to a maximum best torque (MBT) as possible. MBT refers to the maximum engine output torque that is generated for a given air flow as spark advance is increased, while using fuel having an octane rating greater than a predetermined octane rating and using stoichiometric fueling. The spark advance at which this maximum torque occurs is referred to as an MBT spark timing. The calibrated spark timing may differ slightly from MBT spark timing because of, for example, fuel quality (such as when lower octane fuel is used) and environmental factors. The engine output torque at the calibrated spark timing may therefore be less than MBT.

The cylinder shut-off torque request 270 may be used by the cylinder control module 236 to determine how many cylinders to deactivate. The cylinder control module 236 may instruct the cylinder actuator module 120 to deactivate one or more cylinders of the engine 102. In various implementations, a predefined group of cylinders (e.g., half) may be deactivated jointly.

The cylinder control module 236 may also instruct the fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted. The cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to the cylinders based on the fuel torque request 271. During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a fuel mass that will yield stoichiometric combustion when combined with the current amount of air per cylinder. The fuel control module 240 may instruct the fuel actuator module 124 via a fueling rate 272 to inject this fuel mass for each activated cylinder.

The air control module 228 may determine the desired throttle position 267 based on the air torque request 265. The air control module 228 may output the desired throttle position 267 to a throttle control module 280. The throttle control module 280 generates a desired pulse width modulation (PWM) signal 282 using closed-loop control based on the desired throttle position 267. The throttle actuator module 116 actuates the throttle valve 112 based on the desired PWM signal 282. More specifically, the desired PWM signal 282 may drive (e.g., a motor of) the throttle actuator module 116 to actuate the throttle valve 112. While the desired PWM signal 282 is shown and discussed, the throttle control module 280 may control the throttle actuator module 116 using another suitable type of signal.

The air control module 228 may output the desired MAP 266 to the boost scheduling module 248. The boost scheduling module 248 uses the desired MAP 266 to control the boost actuator module 165. The boost actuator module 165 then controls one or more turbochargers (e.g., the turbocharger including the turbine 160-1 and the compressor 160-2) and/or superchargers.

The air control module 228 outputs the desired APC 268 to the phaser scheduling module 252. Based on the desired APC 268 and the RPM signal, the phaser scheduling module 252 may control positions of the intake and/or exhaust cam phasers 148 and 150 using the phaser actuator module 158.

Figure 3:
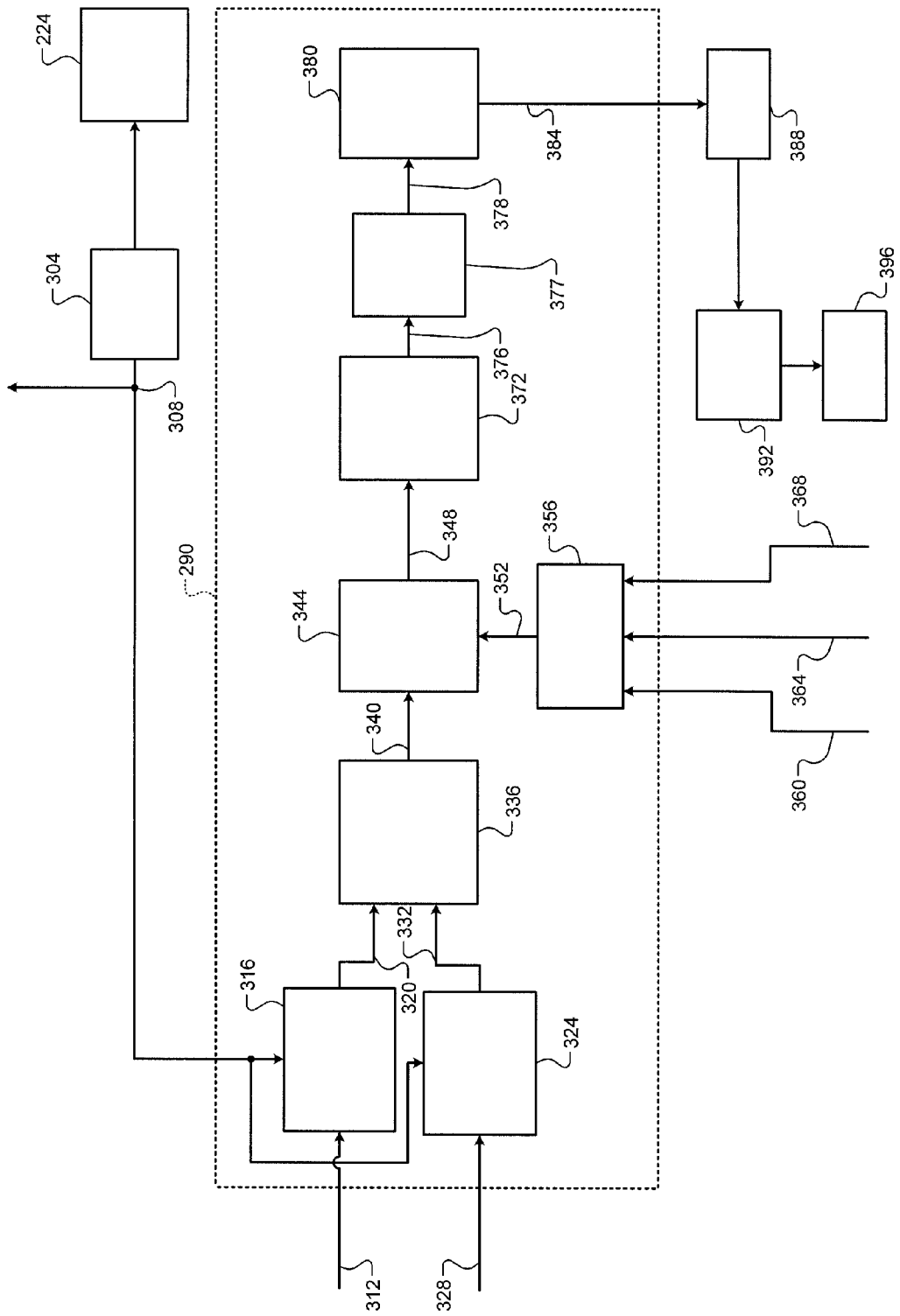
FIG. 3 is a functional block diagram of an example catalyst monitoring system according to the present disclosure.
Figure 4:
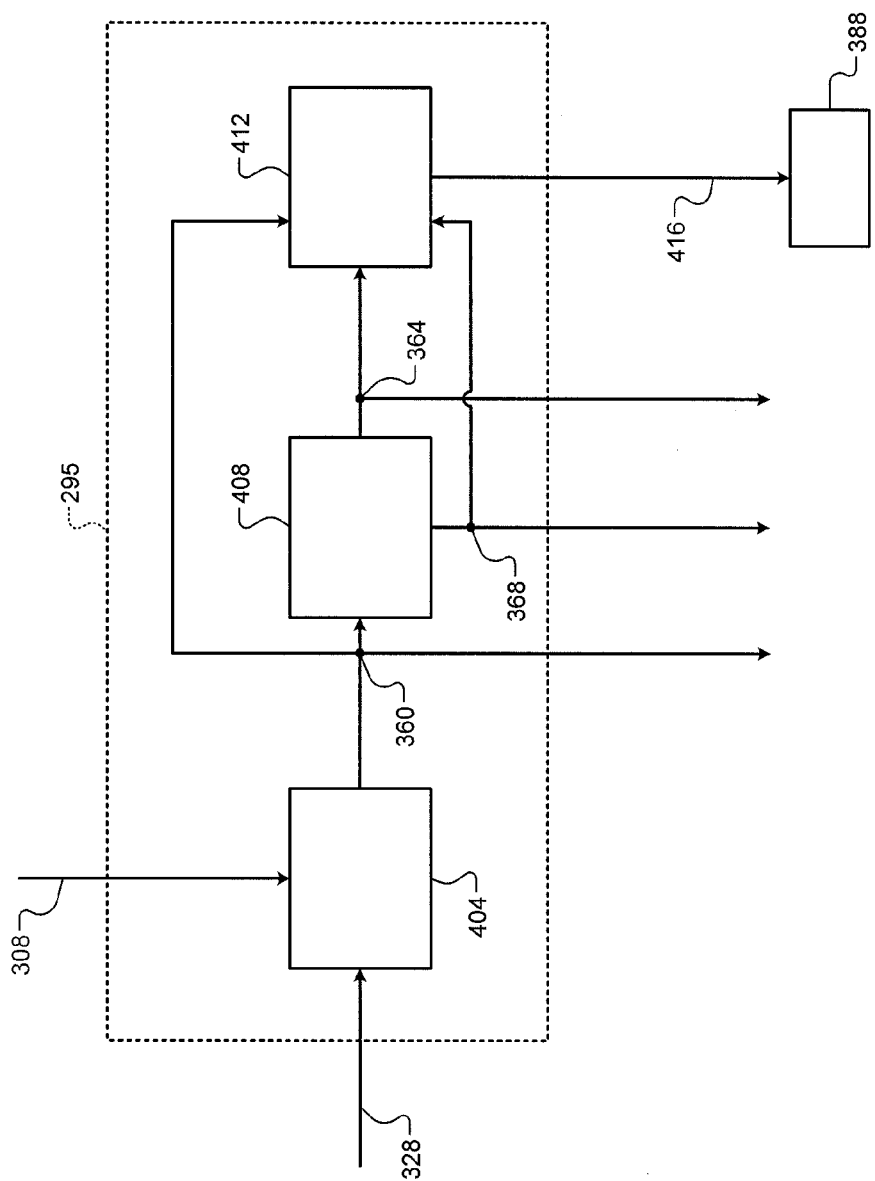
FIG. 4 is a functional block diagram of an example downstream oxygen sensor monitoring system according to the present disclosure.

The ECM 114 may also include a catalyst monitoring module 290 (see also FIG. 3) and a sensor monitoring module 295 (see also FIG. 4). As stated above, the catalyst 136 stores oxygen when the exhaust provided to the catalyst 136. The catalyst monitoring module 290 monitors the ability of the catalyst 136 to store oxygen and selectively diagnoses the presence of a fault in the catalyst 136 based on the catalyst's 136 ability to store oxygen.

An oxygen storage capacity (OSC) period may be indicative of the catalyst's 136 ability to store oxygen. The catalyst monitoring module 290 may determine the OSC period for the catalyst 136 using the responses of the upstream and downstream oxygen sensors 176 and 177 to a change in fueling. More specifically, the catalyst monitoring module 290 may determine the OSC period for the catalyst 136 based on the period between a first time when the upstream oxygen sensor 176 responds to a transition from fuel rich fueling to fuel lean fueling and a second time when the downstream oxygen sensor 177 responds the transition.

When the OSC period is greater than a predetermined period, the catalyst monitoring module 290 may determine that the fault is not present in the catalyst 136. Conversely, the catalyst monitoring module 290 may determine that the fault is present in the catalyst 136 when the OSC period is less than the predetermined period.

Delay of the downstream oxygen sensor 177 generating its output indicative of a change in the oxygen concentration of the exhaust, however, may cause the downstream oxygen sensor 177 to respond to the transition later than it should. Accordingly, the delay in the downstream oxygen sensor 177 causes the OSC period to increase. The delay of the downstream oxygen sensor 177 may therefore cause the catalyst monitoring module 290 to incorrectly determine that the fault is not present in the catalyst 136.

The sensor monitoring module 295 also monitors the response of the downstream oxygen sensor 177 to a transition from fuel rich fueling to fuel lean fueling. Based on the response of the downstream oxygen sensor 177 to the transition, the sensor monitoring module 295 determines a parameter that corresponds to the delay of the downstream oxygen sensor 177.

The catalyst monitoring module 290 of the present disclosure determines the delay of the downstream oxygen sensor 177 based on the parameter. The catalyst monitoring module 290 corrects the OSC period based on the delay of the downstream oxygen sensor 177 and uses the corrected OSC period in determining whether the fault is present in the catalyst 136.

Referring now to FIG. 3, a functional block diagram of an example implementation of the catalyst monitoring system is presented. A fuel command module 304 selectively commands the actuation module 224 to generate the fuel torque request 271 such that the fueling rate 272 is transitioned from fuel rich to fuel lean. For example only, the fuel command module 304 may command the actuation module 224 to generate the fuel torque request 271 to perform the transition in conjunction with performance of deceleration fuel cutoff (DFCO), while the engine 102 is idling, while the engine 102 is not idling, or at another suitable time.

The fuel command module 304 generates a rich to lean (R to L) transition indicator 308 when the fuel command module 304 commands the transition from fuel rich to fuel lean to be performed. When the transition is performed, the upstream oxygen sensor 176 receives the fuel lean exhaust before the catalyst 136 and the downstream oxygen sensor 177. Thus, an upstream oxygen concentration 312 generated based on the signal generated by the upstream oxygen sensor 176 should respond to the transition before the downstream oxygen sensor 177.

An upstream oxygen monitoring module 316 may reset and start an upstream timer value in response to the rich to lean transition indicator 308 being generated. The upstream timer value therefore corresponds to the period that has passed since the transition from fuel rich to fuel lean was commanded.

The upstream oxygen monitoring module 316 monitors the upstream oxygen concentration 312. The upstream oxygen monitoring module 316 may compare the upstream oxygen concentration 312 with a first predetermined value. When the exhaust is fuel rich, the upstream oxygen concentration 312 may be greater than the first predetermined value. The upstream oxygen monitoring module 316 may set an upstream transition period 320 equal to the upstream timer value when the upstream oxygen concentration 312 transitions from greater than the first predetermined value to less than the first predetermined value. In this manner, the upstream transition period 320 indicates the period between the time when the transition from fuel rich to fuel lean was commanded and the time when the upstream oxygen sensor 176 indicated that the exhaust gas is fuel lean.

A downstream oxygen monitoring module 324 may reset and start a downstream timer value in response to the rich to lean transition indicator 308 being generated. The downstream timer value therefore also corresponds to the period that has passed since the transition from fuel rich to fuel lean was commanded.

The downstream oxygen monitoring module 324 monitors a downstream oxygen concentration 328. The downstream oxygen concentration 328 is generated based on the signal generated by the downstream oxygen sensor 177. The downstream oxygen monitoring module 324 may compare the downstream oxygen concentration 328 with a second predetermined value. When the exhaust is fuel rich, the downstream oxygen concentration 328 may be greater than the second predetermined value. The second predetermined value may be the same as or different than the first predetermined value.

The downstream oxygen monitoring module 324 may set a downstream transition period 332 equal to the downstream timer value when the downstream oxygen concentration 328 transitions from greater than the second predetermined value to less than the second predetermined value. In this manner, the downstream transition period 332 indicates the period between the time when the transition from fuel rich to fuel lean was commanded and the time when the downstream oxygen sensor 177 indicated that the exhaust gas is fuel lean.

An oxygen storage capacity (OSC) determination module 336 determines an OSC period 340 for the catalyst 136 based on the upstream and downstream transition periods 320 and 332. The OSC period 340 corresponds to an amount of oxygen that the catalyst 136 is capable of storing. The OSC determination module 336 sets the OSC period 340 based on a difference between the upstream transition period 320 and the downstream transition period 332. For example only, the OSC determination module 336 may set the OSC period 340 equal to the downstream transition period 332 minus the upstream transition period 320.

A correction module 344 determines a corrected OSC period 348 based on the OSC period 340 and a sensor delay period 352. The correction module 344 determines the corrected OSC period 348 based on a difference between the OSC period 340 and the sensor delay period 352. For example only, the correction module 344 may set the corrected OSC period 348 equal to the OSC period 340 minus the sensor delay period 352.

The sensor delay period 352 corresponds to a period between when fuel lean exhaust is provided to the downstream oxygen sensor 177 and when the downstream oxygen sensor 177 generates the signal indicating that the exhaust is fuel lean. A delay determination module 356 determines the sensor delay period 352 based on one of an area 360 and a filtered version of the area 360. The filtered version of the area 360 will be referred to as a filtered area 364. The delay determination module 356 selects the one of the area and the filtered area 364 to use in determining the sensor delay period 352 based on a filter state 368. The area 360, the filtered area 364, and the filter state 368 are discussed further below in conjunction with FIG. 4.

The delay determination module 356 may select the area 360 when the filter state 368 is a first state. The delay determination module 356 may select the filtered area 364 when the filter state 368 is a second state. The delay determination module 356 determines the sensor delay period 352 based on the selected one of the area 360 and the filtered area 364 using one of a function and a mapping (e.g., a lookup table) that relates area to sensor delay period.

A normalizing module 372 normalizes the corrected OSC period 348 and generates an OSC ratio 376. The normalizing module 372 may normalize the corrected OSC period 348 by adjusting the corrected OSC period 348 as a function of a temperature of the catalyst 136 and an engine airflow (e.g., MAF). For example only, the normalizing module 372 may increase the corrected OSC period 348 as the temperature of the catalyst 136 increases and vice versa. The normalizing module 372 may additionally or alternatively increase the corrected OSC period 348 as the engine airflow increases and vice versa. For example only, the normalizing module 372 may set the OSC ratio 376 based on the equation:

$$OSC\ RATIO = \frac{Corrected-Unacceptable}{Acceptable-Unacceptable}, \quad (2)$$

where OSC RATIO is the OSC ratio 376, Corrected is the corrected OSC period 348 (after being adjusted for the temperature and engine airflow), Unacceptable is a predetermined OSC period for a catalyst that has the fault, and Acceptable is a predetermined OSC period for a catalyst that does not have the fault.

A ratio filtering module 377 may apply a filter to the OSC ratio 376 to generate a filtered OSC ratio 378. For example only, the filter may be an exponentially weighted moving average (EWMA) filter. The ratio filtering module 377 may generate the filtered OSC ratio 378 based on a EWMA of the present value of the OSC ratio 376 and M previous values of the area 360 from M previous rich to lean transitions, respectively. M is an integer greater than zero.

A catalyst fault detection module 380 determines whether the fault is present in the catalyst 138 based on the filtered OSC ratio 378. For example only, the catalyst fault detection module 380 may determine that the fault is present in the catalyst 136 when the filtered OSC ratio 378 is less than a predetermined value. Conversely, the catalyst fault detection module 380 may determine that the fault is not present in the catalyst 136 when the filtered OSC ratio 378 is greater than the predetermined value. The fault may indicate that the ability of the catalyst 136 to store oxygen is less than an acceptable level. The predetermined value may be a value between 0.0 and 1.0 in various implementations.

The catalyst fault detection module 380 may take one or more remedial actions when the fault is present in the catalyst 136. For example only, the catalyst fault detection module 380 may selectively adjust one or more engine operating parameters (e.g., the fueling rate 272). The catalyst fault detection module 380 may additionally or alternatively store a catalyst fault indicator 384 in memory 388. The catalyst fault indicator 384 may include, for example, a predetermined diagnostic trouble code (DTC). The catalyst fault indicator 384 indicates that the fault is present in the catalyst 136. A fault monitoring module 392 may monitor the memory 388 and illuminate an indicator, such as a malfunction indicator lamp (MIL) 396, when the fault is present in the catalyst 136.

Referring now to FIG. 4, a functional block diagram of an example implementation of the sensor monitoring module 295 is presented. An area determination module 404 may monitor the downstream oxygen concentration 328 in response to the rich to lean transition indicator 308 being generated. The area determination module 404 may determine the area 360 based on one or more mathematical integrals of the downstream oxygen concentration 328 between the time when the rich to lean transition indicator 308 is generated and a later time when the downstream oxygen concentration 328 becomes less than a third predetermined value. The area 360 may correspond to the area under a curve formed by the downstream oxygen concentration 328 between the time when the rich to lean transition indicator 308 was generated and the later time when the downstream oxygen concentration 328 became less than the third predetermined value. The third predetermined value may be the same as or different than the first predetermined value and may be the same as or different than the second predetermined value.

An area filtering module 408 applies a filter to the area 360 to generate the filtered area 364. For example only, the filter may be an exponentially weighted moving average (EWMA) filter. The weighting may be the same as or different than the weighting applied by the EWMA filter of the ratio filtering module 377. The area filtering module 408 may generate the filtered area 364 based on a EWMA of the present value of the area 360 and N previous values of the area 360 from N previous rich to lean transitions, respectively. N is an integer greater than zero. N may be equal to or different than M.

Initially, such as at start up (e.g., key ON), the previous values of the area 360 used in generating the filtered area 364 may be set to a predetermined initialization value. The area filtering module 408 may generate the filter state 368 based on the previous values of the area 360. More specifically, the area filtering module 408 may generate the filter state 368 based on whether at least N values of the area 360 have been obtained since the previous values of the area 360 were last set to the predetermined initialization value. If so, the area filtering module 408 sets the filter state 368 to the second state. If not, the area filtering module 408 sets the filter state 368 to the first state. In this manner, the delay determination module 356 will use the area 360 to determine the sensor delay period 352 until at least N values of the area 360 have been obtained since the previous values of the area 360 were last set to the predetermined initialization value. After at least N values of the area 360 have been obtained since the previous values of the area 360 were last set to the predetermined initialization value, the delay determination module 356 will use the filtered area 364 to determine the sensor delay period 352.

The sensor monitoring module 295 may also include a sensor fault detection module 412. The sensor fault detection module 412 may select one of the area 360 and the filtered area 364 based on the filter state 368. The sensor fault detection module 412 may select the area 360 when the filter state 368 is in the first state and may select the filtered area 364 when the filter state 368 is in the second state.

The sensor fault detection module 412 determines whether a fault is present in the downstream oxygen sensor 177 based on the selected one of the area 360 and the filtered area 364. For example only, the sensor fault detection module 412 may determine that the fault is present in the downstream oxygen sensor 177 based on a comparison of the selected one of the area 360 and the filtered area 364 and a predetermined area. The fault may indicate that the delay associated with the downstream oxygen sensor 177 is greater than an acceptable level.

The sensor fault detection module 412 may take one or more remedial actions when the fault is present in the downstream oxygen sensor 177. For example only, the sensor fault detection module 412 may selectively adjust one or more engine operating parameters. The sensor fault detection module 380 may additionally or alternatively store a downstream sensor fault indicator 416 in the memory 388. The downstream sensor fault indicator 416 may include, for example, a predetermined DTC. The downstream sensor fault indicator 416 indicates that the fault is present in the downstream oxygen sensor 177. The fault monitoring module 392 may illuminate the indicator when the fault is present in the downstream oxygen sensor 177.

Figure 5:
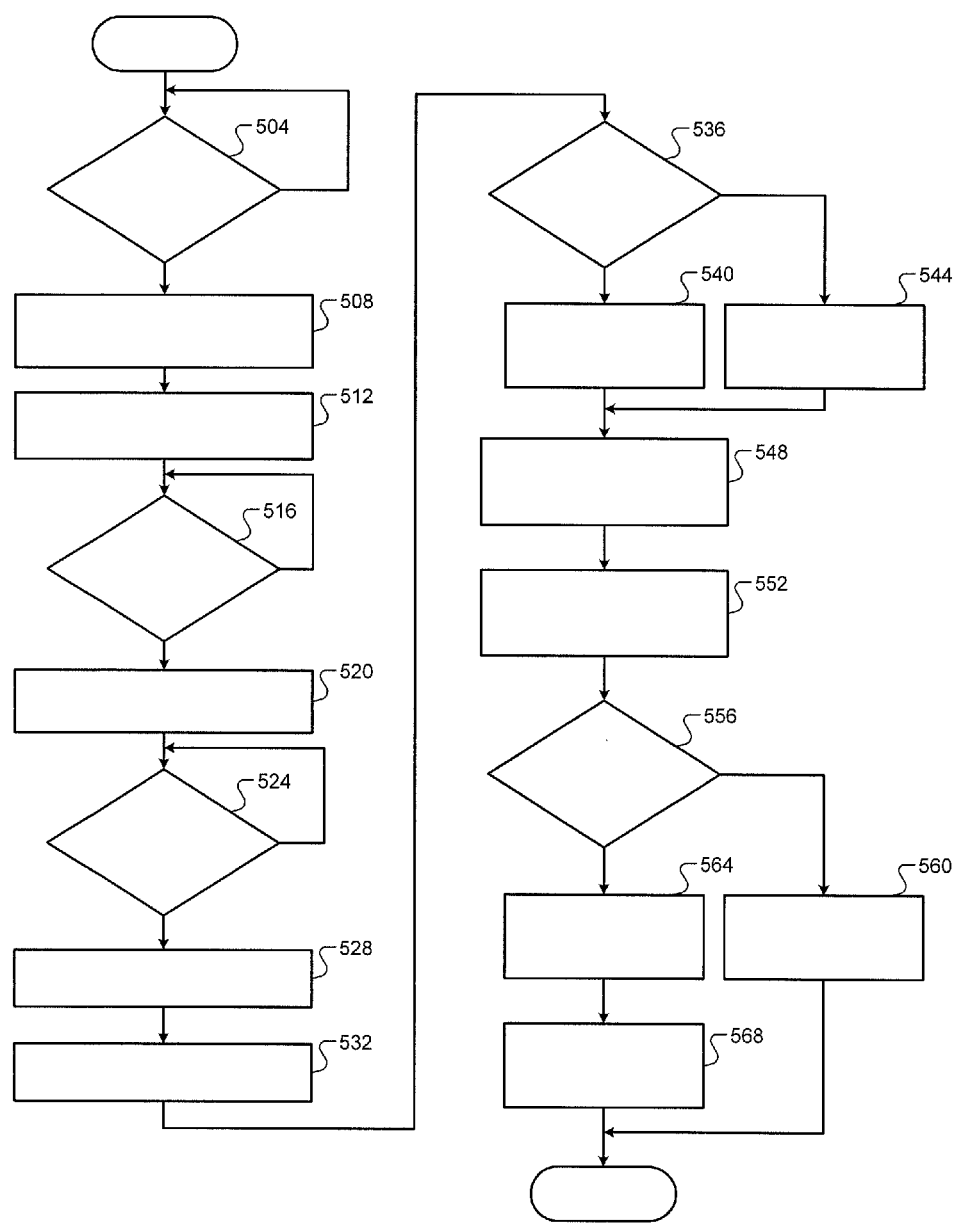
FIG. 5 is a flowchart depicting an example method of correcting an oxygen storage capacity period of a catalyst based on a delay period of a downstream oxygen sensor according to the present disclosure.

Referring now to FIG. 5, a flowchart depicting an example method of correcting the OSC period 340 based on the sensor delay period 352 and indicating whether the fault is present in the catalyst 136 is presented. Control may begin with 504 where control determines whether one or more conditions are satisfied for commanding a transition in the fueling of the engine 102 from fuel rich to fuel lean. If true, control continues with 508; if false, control remains at 504.

At 508, control generates the rich to lean transition indicator 308. At 512, control may command a transition in the fueling of the engine 102 from fuel rich to fuel lean. At 516, control determines whether the upstream oxygen concentration 312 is greater than the first predetermined value. If true, control proceeds with 520; if false, control may remain at 516.

Control may set the upstream transition period 320 equal to the period between the time when control commanded the transition and the present time. At 524, control determines whether the downstream oxygen concentration 328 is less than the second predetermined value. If true, control may continue with 528; if false, control may remain at 524.

At 528, control may set the downstream transition period 332 equal to the period between the time when control commanded the transition and the present time. Control determines the OSC period 340 for the catalyst 136 based on the upstream and downstream transition periods 320 and 332 at 532. Control determines the OSC period 340 based on a difference between the upstream transition period 320 and the downstream transition period 332. For example, control may set the OSC period 340 equal to the downstream transition period 332 minus the upstream transition period 320.

At 536, control determines whether the filter state 368 indicates the first state. If true, control proceeds with 540; if false, control proceeds with 544. At 540, control determines the sensor delay period 352 based on the area 360. At 544, control determines the sensor delay period 352 based on the filtered area 364. Control may determine the sensor delay period 352 using the selected one of the area 360 and the filtered area 364 and one of a function and a mapping that relates area to sensor delay period. Control proceeds with 548 after 540 or 544.

Control corrects the OSC period 340 based on the sensor delay period 352 at 548 to generate the corrected OSC period 348. Control may set the corrected OSC period 348 based on a difference between the OSC period 340 and the sensor delay period 352. For example, control may set the corrected OSC period 348 equal to the OSC period 340 minus the sensor delay period 352.

At 552, control determines the OSC ratio 376. Control determines the OSC ratio 376 based on the corrected OSC period 348. Control may determine the OSC ratio 376 using equation (2) described above. Control may also apply a filter to the OSC ratio 376 at 552 to generate the filtered OSC ratio 378. For example only, the filter may include a EWMA filter, and one or more previous values of the OSC ratio 376 from previous transitions of the fueling of the engine from fuel rich to fuel lean may be used.

Control may determine whether the filtered OSC ratio 378 is less than a predetermined value at 556, If false, control may generate the catalyst fault indicator 384 to indicate that a fault is not present in the catalyst 136 at 560, and control may end. If true, control may generate the catalyst fault indicator 384 to indicate that the fault is present in the catalyst 136 at 564. Control may continue with 568 where control may take one or more remedial actions, such as illuminating the MIL 396, setting the DTC in the memory 388 indicating that the fault is present in the catalyst 136, adjusting one or more engine operating parameters, and/or one or more other suitable remedial actions. Control may end after 568 or 560. While control is shown and discussed as ending, FIG. 5 may be illustrative of one control loop, and control may return to 504.

Figure 6:
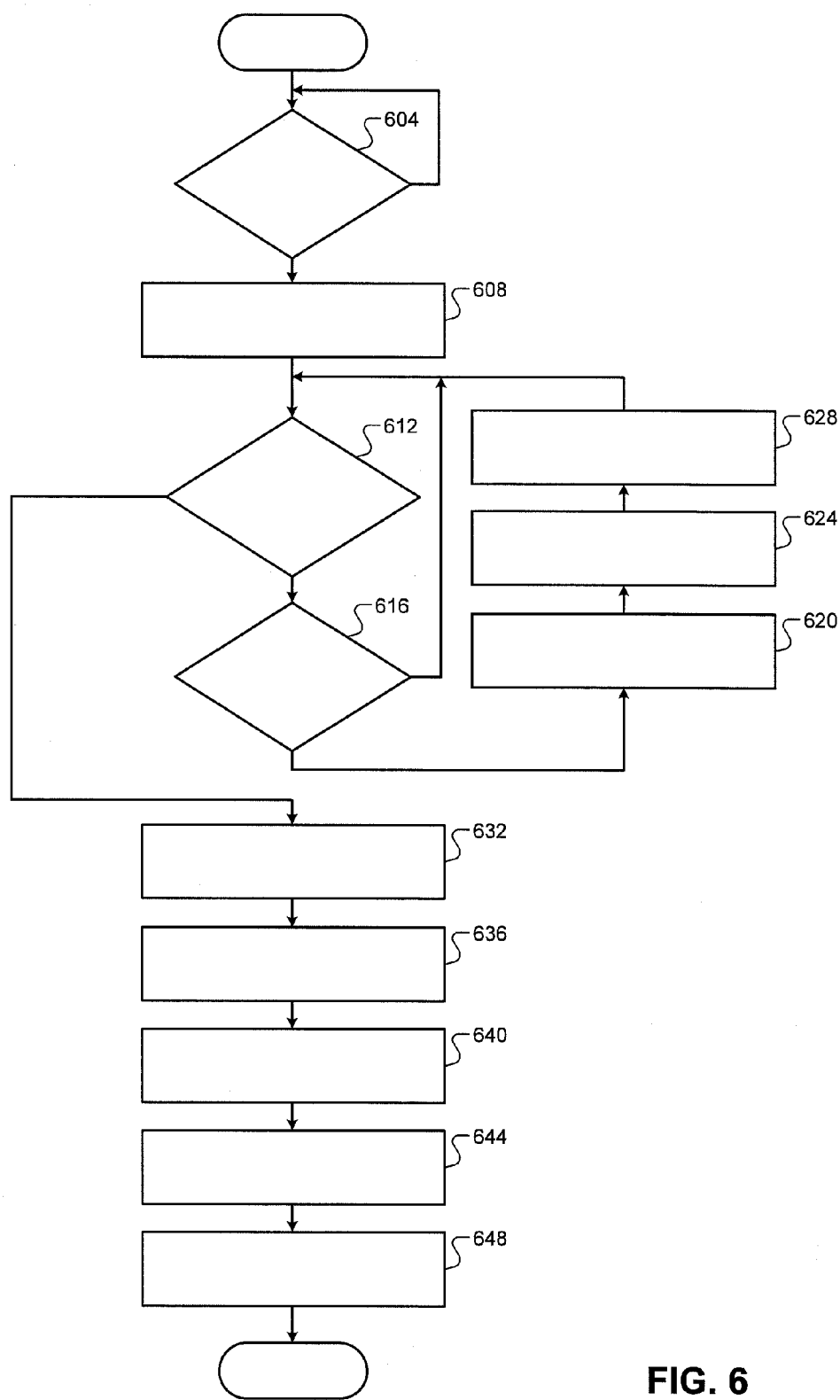
FIG. 6 is a flowchart depicting an example method of determining the delay period of the downstream oxygen sensor according to the present disclosure.

Referring now to FIG. 6, a flowchart depicting an example method of generating the sensor delay period 352 is presented. Control may begin with 604 where control determines whether the rich to lean transition indicator 308 is being generated. If true, control continues with 608. If false, control may remain at 604.

At 608, control may reset a timer and sample the downstream oxygen concentration 328. Control may determine whether the downstream oxygen concentration 328 is less than the third predetermined value at 612. If true, control may proceed with 632, which is discussed further below. If false, control may proceed with 616.

Control determines whether the timer corresponds to a predetermined sampling period at 616. If so, control may continue with 620. If false, control may return to 612. At 620, control may reset the timer and sample the downstream oxygen concentration 328. Control may determine a partial area based on the sample of the downstream oxygen concentration 328 and a last value of the downstream oxygen concentration 328 at 624. The first instance that control executes 624, the last value of the downstream oxygen concentration 328 is the value of the downstream oxygen concentration taken at 608. After control executes 624 once, the last value of the downstream oxygen concentration 328 may be the value of the downstream oxygen concentration from the last execution of 620. Control may determine the partial area based on an integral of the change between the sample and the last value over the sampling period. Control may add (sum) the partial area to (with) an accumulated area at 628, and control may return to 612.

Referring back to 632 (when the downstream oxygen concentration 328 is less than the third predetermined value at 612), control may sample the downstream oxygen concentration 328. Control may determine a partial area based on the sample of the downstream oxygen concentration 328 and a last value of the downstream oxygen concentration 328 at 636. The last value of the downstream oxygen concentration 328 for purposes of 636 may be the value of the downstream oxygen concentration taken during a last execution of 620. Control may determine the partial area based on an integral of the change between the sample taken at 632 and the last value over the period corresponding to the timer. Control may add (sum) the partial area to (with) the accumulated area at 640.

At 644, control may set the accumulated area equal to the area 360. Control may apply the filter to the area 360 at 648 to generate the filtered area 364. One or more previous values of the area 360 from previous rich to lean transitions may also be used in generating the filtered area 364. Control may apply, for example, a EWMA filter to generate the filtered area 364. Control may determine and indicate whether the fault is present in the downstream oxygen sensor 177 based on one of the filtered area 364 and the area 360. Control may end after 648. While control is shown and discussed as ending, FIG. 6 may be illustrative of one control loop, and control may return to 604. Control may execute portions of the methods of FIGS. 5 and 6 in parallel (e.g., simultaneously) in response to a rich to lean transition.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
an oxygen storage capacity (OSC) determination module that determines an OSC period of a catalyst of an exhaust system based on first and second amounts of oxygen measured using first and second oxygen sensors located upstream and downstream of the catalyst, respectively;
a delay determination module that determines a delay period of the second oxygen sensor;
a correction module that sets a corrected OSC period for the catalyst based on a difference between the OSC period and the delay period;
a fault detection module that selectively indicates that a fault is present in the catalyst based on the corrected OSC period;
a fuel control module that selectively commands a transition of fueling of an engine from a fuel rich state to a fuel lean state;
an upstream oxygen monitoring module that determines a first period between a first time when the transition is commanded and a second time when the first amount of oxygen crosses a first predetermined value;
a downstream oxygen monitoring module that determines a second period between the first time and a third time the second amount of oxygen crosses a second predetermined value,
wherein the OSC determination module determines the OSC period for the catalyst based on the first and second periods;
an area determination module that monitors the second amount and that determines an area under a curve formed by the second amount between the first time and a fourth time when the second amount crosses a third predetermined value; and
an area filtering module that generates a filtered area using the area, N previous values of the area from N previous transitions from the fuel rich state to the fuel lean state, and a filter,
wherein the delay determination module determines the delay period based on one of the area and the filtered area.

2. The system of claim 1 wherein the correction module sets the corrected OSC period to the OSC period minus the delay period.

3. The system of claim 1 wherein the OSC determination module sets the OSC period to a difference between the first and second periods.

4. The system of claim 1 wherein the delay determination module determines the delay period further based on a mapping of delay periods indexed by areas.

5. The system of claim 1 wherein the delay determination module determines the delay period as a function of the one of the area and the filtered area.

6. The system of claim 1 wherein the filter is an exponentially weighted moving average filter.

7. The system of claim 1 further comprising a sensor fault detection module that selectively indicates that a fault is present in the second oxygen sensor based on one of the area and the filtered area.

8. The system of claim 1 further comprising a fault monitoring module that monitors the indication of the fault detection module and that selectively activates an indicator lamp in response to the fault detection module indicating that the fault is present in the catalyst.

9. A method for a vehicle, comprising:
determining an oxygen storage capacity (OSC) period of a catalyst of an exhaust system based on first and second amounts of oxygen measured using first and second oxygen sensors located upstream and downstream of the catalyst, respectively;
determining a delay period of the second oxygen sensor;
setting a corrected OSC period for the catalyst based on a difference between the OSC period and the delay period;
selectively indicating that a fault is present in the catalyst based on the corrected OSC period;
selectively commanding a transition of fueling of an engine from a fuel rich state to a fuel lean state;
determining a first period between a first time when the transition is commanded and a second time when the first amount of oxygen crosses a first predetermined value;
determining a second period between the first time and a third time the second amount of oxygen crosses a second predetermined value,
wherein determining the OSC period includes determining the OSC period for the catalyst based on the first and second periods;
monitoring the second amount;
determining an area under a curve formed by the second amount between the first time and a fourth time when the second amount crosses a third predetermined value; and
generating a filtered area using the area, N previous values of the area from N previous transitions from the fuel rich state to the fuel lean state, and a filter,
wherein determining the delay period includes determining the delay period based on one of the area and the filtered area.

10. The method of claim 9 further comprising setting the corrected OSC period to the OSC period minus the delay period.

11. The method of claim 9 further comprising setting the OSC period to a difference between the first and second periods.

12. The method of claim 9 further comprising determining the delay period further based on a mapping of delay periods indexed by areas.

13. The method of claim 9 further comprising determining the delay period as a function of the one of the area and the filtered area.

14. The method of claim 9 wherein the filter is an exponentially weighted moving average filter.

15. The method of claim 9 further comprising selectively indicating that a fault is present in the second oxygen sensor based on one of the area and the filtered area.

16. The method of claim 9 further comprising selectively activating an indicator lamp in response to an indication that the fault is present in the catalyst.

* * * * *